(12) United States Patent
Lee et al.

(10) Patent No.: US 10,472,510 B2
(45) Date of Patent: Nov. 12, 2019

(54) THERMOPLASTIC RESIN COMPOSITION AND ARTICLE MANUFACTURED USING THE SAME

(71) Applicant: Lotte Advanced Materials Co., Ltd., Yeosu-si (KR)

(72) Inventors: Eun Joo Lee, Uiwang-si (KR); Young Chul Kwon, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 15 days.

(21) Appl. No.: 15/855,421

(22) Filed: Dec. 27, 2017

(65) Prior Publication Data

US 2018/0186989 A1   Jul. 5, 2018

(30) Foreign Application Priority Data

Dec. 30, 2016   (KR) .................. 10-2016-0184170

(51) Int. Cl.
*C08K 3/20* (2006.01)
*C08K 5/3435* (2006.01)
*C08K 5/3445* (2006.01)
*C08L 25/12* (2006.01)
*C08L 55/02* (2006.01)
*C08K 3/22* (2006.01)

(52) U.S. Cl.
CPC ...... *C08L 25/12* (2013.01); *C08K 2003/2296* (2013.01); *C08L 55/02* (2013.01); *C08L 2201/08* (2013.01)

(58) Field of Classification Search
CPC .. C08L 25/12; C08K 3/015; C08K 2003/2296
See application file for complete search history.

(56) References Cited

U.S. PATENT DOCUMENTS

| | | | |
|---|---|---|---|
| 3,041,303 A | 6/1962 | Nelson | |
| 3,354,108 A | 11/1967 | Paradis et al. | |
| 4,331,786 A | 5/1982 | Foy et al. | |
| 4,356,300 A | 10/1982 | Isler et al. | |
| 4,612,340 A | 9/1986 | Ohachi | |
| 5,714,534 A | 2/1998 | Kojima et al. | |
| 5,714,545 A | 2/1998 | Lee et al. | |
| 5,906,679 A | 5/1999 | Watanabe et al. | |
| 6,166,116 A | 12/2000 | Sleeckx | |
| 6,297,307 B1 | 10/2001 | Eichenauer et al. | |
| 6,663,877 B1 | 12/2003 | Appleton et al. | |
| 8,128,998 B2 * | 3/2012 | Li | C08G 18/222 427/385.5 |
| 2002/0106413 A1 | 8/2002 | Herbst et al. | |
| 2002/0109805 A1 | 8/2002 | Baba | |
| 2003/0125413 A1 | 7/2003 | Herbst et al. | |
| 2005/0043485 A1 | 2/2005 | Lee et al. | |
| 2005/0131100 A1 | 6/2005 | Herbst et al. | |
| 2007/0009691 A1 | 1/2007 | Barre et al. | |
| 2007/0049678 A1 | 3/2007 | Kim et al. | |
| 2010/0264383 A1 * | 10/2010 | Tooley | C08J 3/226 252/589 |
| 2014/0017335 A1 | 1/2014 | Dimov et al. | |
| 2016/0326670 A1 | 11/2016 | Kang et al. | |
| 2017/0198132 A1 | 7/2017 | Choi et al. | |
| 2018/0112056 A1 | 4/2018 | Yang et al. | |
| 2018/0118914 A1 | 5/2018 | Bae et al. | |
| 2018/0179314 A1 | 6/2018 | Kim et al. | |
| 2018/0179373 A1 | 6/2018 | Kim et al. | |
| 2018/0186989 A1 | 7/2018 | Lee et al. | |

FOREIGN PATENT DOCUMENTS

| | | |
|---|---|---|
| CN | 1710153 A1 | 12/2005 |
| CN | 1919542 A | 2/2007 |
| CN | 101001805 A | 7/2007 |
| CN | 101880426 A | 11/2010 |
| CN | 107974030 A | 5/2018 |
| EP | 1190622 A1 | 3/2002 |
| EP | 1510549 A1 | 3/2005 |
| EP | 3026082 A1 | 6/2016 |
| EP | 3326975 A1 | 5/2018 |
| EP | 3339367 A1 | 6/2018 |
| EP | 3339370 A1 | 6/2018 |
| FR | 1439417 A | 5/1966 |
| GB | 1040287 A | 8/1966 |

(Continued)

OTHER PUBLICATIONS

Office Action in counterpart Korean Application No. 10-2016-0184170 dated Sep. 6, 2018, pp. 1-6.
Prasanna et al., "Insight into the Mechanism of Antibacterial Activity of ZnO: Surface Defects Mediated Reactive Oxygen Species Even in the Dark", Langmuir 2015, vol. 31, pp. 9155-9162 (Jul. 29, 2015).
Search Report in counterpart European Application No. 17210669.2 dated Apr. 20, 2018, pp. 1-5.
Office Action in commonly owned Korean Application No. 10-2016-0177857 dated Nov. 20, 2018, pp. 1-8.
Extended Search Report in commonly owned European Application No. 17210117.2, dated Apr. 30, 2018, pp. 1-5.

(Continued)

*Primary Examiner* — Tae H Yoon
(74) *Attorney, Agent, or Firm* — Additon, Higgins & Pendleton, P.A.

(57) ABSTRACT

Disclosed herein is a thermoplastic resin composition. The thermoplastic resin composition includes: a thermoplastic resin including a rubber-modified vinyl graft copolymer and an aromatic vinyl copolymer resin; a light stabilizer including a hindered amine light stabilizer (HALS) and a benzotriazole UV stabilizer; and zinc oxide having an average particle diameter of about 0.5 μm to about 3 μm and a BET specific surface area of about 1 $m^2$/g to about 10 $m^2$/g. The thermoplastic resin composition can have good properties in terms of weather resistance, impact resistance, appearance, and/or antibacterial properties (activity).

13 Claims, No Drawings

(56) References Cited

FOREIGN PATENT DOCUMENTS

| | | |
|---|---|---|
| JP | 55-133424 A | 10/1980 |
| JP | 56-045419 A | 4/1981 |
| JP | 08-253640 A | 10/1996 |
| JP | 10-182927 A | 7/1998 |
| JP | H10195309 A | 7/1998 |
| JP | 10-251444 A | 9/1998 |
| JP | 11-035787 A | 2/1999 |
| JP | 2001-220486 A | 8/2001 |
| JP | 2006-182841 A1 | 7/2006 |
| JP | 2014-172783 A | 9/2014 |
| JP | 2014-221708 A | 11/2014 |
| JP | 2016-121273 A | 7/2016 |
| KR | 10-2002-0008203 A | 1/2002 |
| KR | 10-0696385 B1 | 3/2007 |
| KR | 10-2007-0047073 A | 5/2007 |
| KR | 10-2010-0087603 A | 8/2010 |
| KR | 10-1334283 B1 | 11/2013 |
| KR | 10-1452020 B1 | 10/2014 |
| KR | 10-2016-0083527 A | 7/2016 |

OTHER PUBLICATIONS

Extended Search Report in commonly owned European Application No. 17209267.8 dated Mar. 26, 2018, pp. 1-7.
Office Action in commonly owned Korean Application No. 10-2016-0176575 dated Nov. 1, 2018, pp. 1-7.
Office Action in commonly owned Korean Application No. 10-2017-0075940 dated Aug. 21, 2017, pp. 1-8.
Extended Search Report in commonly owned European Application No. 17198304.2 dated Mar. 12, 2018, pp. 1-5.
Office Action in commonly owned Taiwanese Application No. 106136641 dated Aug. 17, 2018, pp. 1-6.
Office Action in commonly owned U.S. Appl. No. 15/790,334 dated Apr. 16, 2019, pp. 1-18.
Office Action in commonly owned Korean Application No. 10-2017-0111807 dated Nov. 27, 2018, pp. 1-9.
Chandrakanth et al., "Synthesis and characterization of ZnO nanorods with a narrow size distribution", Royal Society of Chemistry, 2015, vol. 5, pp. 49861-49870 (17 pages).
Tsai, "The Influence on Intensity Ratio of Peak Emission between Recombination of Free-Excitons and Deep-Defect for ZnO Nanostructure Evolution from Nanorods to Nanotubes", Proceedings of the 16th International Conference on Nanotechnology, Sendai, Japan, Aug. 22-25, 2016, pp. 387-389.
Machine translated English language equivalent of CN 101880426 (2010, 5 pages).
Machine translated English language equivalent of JP 2014-221708 (2014, 9 pages).
Extended Search Report in commonly owned European Application No. 17199720.8 dated Mar. 7, 2018, pp. 1-7.
Database WPI, Week 201463, Thomson Scientific, London, GB, Abstract of JP 2014-172783 (UBE Kagaku Kogyo KK), pp. 1-2, 2014.
Database WPI, Week 201654, Thomson Scientific, London, GB, Abstract of KR 2016-0083527 (Kolon Plastics Inc.), pp. 1-2, 2016.
Office Action in commonly owned U.S. Appl. No. 15/798,819 dated May 13, 2019, pp. 1-20.
Office Action in commonly owned Chinese Application No. 201711062077.1 dated Jul. 12, 2019, pp. 1-7.
Office Action in commonly owned Chinese Application No. 201711007395.8 dated Jul. 31, 2019, pp. 1-6.
Office Action in commonly owned U.S. Appl. No. 15/845,020 dated Aug. 8, 2019, pp. 1-13.
Machine translated English language equivalent of JP Application No. H09-212736, which is the same as publication JP 11-035787 (1999, 10 pages).
Machine translated English language equivalent of CN 191542 (2007, 5 pages).
Office Action in commonly owned U.S. Appl. No. 15/844,980 dated Sep. 11, 2019, pp. 1-5.
Machine translated English language equivalent of H09-061580, which is the same as JP Publication JP 10-251444 (1998, 14 pages).

* cited by examiner

THERMOPLASTIC RESIN COMPOSITION AND ARTICLE MANUFACTURED USING THE SAME

CROSS-REFERENCE TO RELATED APPLICATION

This application claims priority under 35 USC Section 119 to and the benefit of Korean Patent Application 10-2016-0184170, filed on Dec. 30, 2016, the entire disclosure of which is incorporated herein by reference.

FIELD

The present invention relates to a thermoplastic resin composition and a molded article manufactured using the same.

BACKGROUND

Rubber-modified aromatic vinyl copolymer resins such as an acrylonitrile-butadiene-styrene copolymer resin (ABS resin) can have excellent mechanical properties, processability, and appearance characteristics and thus are widely used as an interior/exterior material for electric/electronic products, an interior/exterior material for automobiles, and an exterior material for buildings.

Since such a rubber-modified aromatic vinyl copolymer resin can suffer from deterioration in properties such as discoloration when used for a long time, research has been conducted to improve weather resistance (discoloration resistance) of the resin. Examples of a method for improving weather resistance include use of an acrylate rubber polymer as a rubber polymer of a rubber-modified aromatic vinyl copolymer resin, addition of a weathering stabilizer, and the like.

However, as the content of the acrylate rubber polymer increases, the acrylate-based rubber-modified aromatic vinyl copolymer resin can have lower impact resistance and the cost burden increases, causing reduction in economic efficiency. In addition, the weatherability stabilizer can cause deterioration in appearance characteristics and mechanical properties due to gas emission when used in excess, making increase in usage of the weatherability stabilizer difficult.

Further, a thermoplastic resin is often required to have antibacterial properties (activity) when used in the manufacture of a molded article that directly or indirectly contacts the human body.

Therefore, there is a need for a thermoplastic resin composition which has good properties in terms of weather resistance and antibacterial properties (activity) without deterioration in mechanical properties such as impact resistance and appearance characteristics while reducing cost burden.

SUMMARY OF THE INVENTION

Embodiments provide a thermoplastic resin composition which can have good properties in terms of weather resistance, impact resistance, appearance, and/or antibacterial properties (activity), and a molded article formed of the same.

The thermoplastic resin composition includes: a thermoplastic resin including a rubber-modified vinyl graft copolymer and an aromatic vinyl copolymer resin; a light stabilizer comprising a hindered amine light stabilizer (HALS) and a benzotriazole UV stabilizer; and zinc oxide having an average particle diameter of about 0.5 μm to about 3 μm and a BET specific surface area of about 1 m$^2$/g to about 10 m$^2$/g.

The thermoplastic resin composition may include: about 100 parts by weight of the thermoplastic resin including about 15 wt % to about 50 wt % of the rubber-modified vinyl graft copolymer and about 50 wt % to about 85 wt % of the aromatic vinyl copolymer resin; about 0.05 parts by weight to about 5 parts by weight of the HALS; about 0.05 parts by weight to about 5 parts by weight of the benzotriazole UV stabilizer; and about 0.1 parts by weight to about 15 parts by weight of the zinc oxide.

The rubber-modified vinyl graft copolymer may be obtained by graft polymerization of a monomer mixture including an aromatic vinyl monomer and a vinyl cyanide monomer to a rubber polymer other than acrylate rubber polymers.

The aromatic vinyl copolymer resin may be a polymer of an aromatic vinyl monomer and a monomer copolymerizable with the aromatic vinyl monomer.

The HALS may include at least one selected from among bis(2,2,6,6-tetramethyl-4-piperidyl) sebacate, bis-(n-octyloxy-tetramethyl)piperidinyl sebacate, bis(1,2,2,6,6-pentamethyl-4-piperidyl) sebacate, methyl-1,2,2,6,6-pentamethyl-4-piperidyl sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, 1,2,3-tris(1,2,2,6,6-pentamethyl-4-piperidyl)-4-tridecyl butane-1,2,3,4-tetracarboxylate, 1,2,3-tris(2,2,6,6-tetramethyl-4-piperidyl)-4-tridecyl butane-1,2,3,4-tetracarboxylate, 1,2,3,4-butanetetracarboxylic acid, and a condensate of 1,2,2,6,6-pentamethyl-4-piperidinol and β,β,β',β'-tetramethyl-3,9-(2,4,8,10-tetraoxaspiro[5.5]undecane)diethanol.

The benzotriazole UV stabilizer may include at least one selected from among 2-(2H-benzotriazole-2-yl)-4-(1,2,3,3-tetramethylbutyl)phenol, 2-(2'-hydroxy-5'-methylphenyl-benzotriazole), 2-(2'-hydroxy-3,5'-2-(2'-hydroxy-3,5'-benzotriazole), 2-(2'-hydroxy-3'-tert-butyl-5'-methylphenyl)-5-chlorobenzotriazole), 2-(2'-hydroxy-3,5'-di-tert-butylphenyl)-5-chlorobenzotriazole, 2-(2'-hydroxy-3,5'-di-tert-amylphenyl)benzotriazole, 2-(2H-benzotriazole-2-yl)-4-(1,1,3,3-tetramethylbutyl)phenol, 2-[2'-hydroxy-3,5'-di(1,1-dimethylbenzyl)phenyl]-2H-benzotriazole, and bis[2-hydroxy-5-tert-octyl-3-(benzotriazole-2-yl)phenyl]methane.

The zinc oxide may have a peak intensity ratio (B/A) of about 0 to about 1, wherein A indicates a peak in the wavelength range of 370 nm to 390 nm and B indicates a peak in the wavelength range of 450 nm to 600 nm in photoluminescence measurement.

The zinc oxide may have a peak position degree (2θ) in the range of 35° to 37° and a crystallite size of about 1,000 Å to about 2,000 Å in analysis of X-ray diffraction (XRD), as calculated by Equation 1:

$$\text{Crystallite size } (D) = \frac{K\lambda}{\beta \cos\theta} \quad \text{[Equation 1]}$$

wherein K is a shape factor, λ is an X-ray wavelength, β is an FWHM value (degree) of an X-ray diffraction peak, and θ is a peak position degree.

A weight ratio of the HALS to the benzotriazole UV stabilizer (HALS:benzotriazole UV stabilizer) may range from about 1:0.9 to about 1:2.

A weight ratio of the light stabilizer to the zinc oxide (light stabilizer:zinc oxide) may range from about 1:0.3 to about 1:20.

The thermoplastic resin composition may have a color variation ($\Delta E$) of about 7 or less, as calculated according to Equation 2:

$$\text{Color variation}(\Delta E) = \sqrt{(\Delta L^*)^2 + (\Delta a^*)^2 + (\Delta b^*)^2} \quad \text{[Equation 2]}$$

where $\Delta L^*$ is a difference ($L_1^* - L_0^*$) between $L^*$ values before/after exposure evaluation; $\Delta a^*$ is a difference ($a_1^* - a_0^*$) between $a^*$ values before/after exposure evaluation; and $\Delta b^*$ is a difference ($b_1^* - b_0^*$) between $b^*$ values before/after exposure evaluation, in which $L_0^*$, $a_0^*$ and $b_0^*$ are initial color values, as measured on an injection molded specimen having a size of 50 mm×90 mm×3 mm using a colorimeter, and $L_1^*$, $a_1^*$ and $b_1^*$ are color values, as measured on the specimen using the colorimeter after exposure evaluation for 300 hours under conditions in accordance with ASTM D4459.

The thermoplastic resin composition may have a notched Izod impact strength of about 15 kgf·cm/cm to about 40 kgf·cm/cm, as measured on a ⅛" thick specimen in accordance with ASTM D256.

The thermoplastic resin composition may have an out-gas emission of about 3,000 ppm or less, as measured on 3 g of a specimen after the specimen is placed on a petri dish, followed by heating to 250° C. for 2 hours.

The thermoplastic resin composition may have an antibacterial activity of about 2 to about 7 (against *Staphylococcus*) and about 2 to about 7 (against *Escherichia coli*), as measured on a 5 cm×5 cm specimen in accordance with HS Z 2801 after the specimen is subjected to inoculation with each of *Staphylococcus aureus* and *Escherichia coli*, followed by culturing under conditions of 35° C. and 90% RH for 24 hours.

Other embodiments relate to a molded article manufactured using the thermoplastic resin composition as set forth above.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In accordance with embodiments of the present invention, a thermoplastic resin composition includes: (A) a thermoplastic resin including (A1) a rubber-modified vinyl graft copolymer and (A2) an aromatic vinyl copolymer resin; (B) a light stabilizer including (B1) a hindered amine light stabilizer (HALS) and (B2) a benzotriazole UV stabilizer; and (C) zinc oxide.

(A) Thermoplastic Resin

According to the present invention, the thermoplastic resin may be a rubber-modified vinyl copolymer resin including (A1) the rubber-modified vinyl graft copolymer and (A2) the aromatic vinyl copolymer resin.

(A1) Rubber-Modified Vinyl Graft Copolymer

In one embodiment of the present invention, the rubber-modified vinyl graft copolymer serves to improve impact resistance and moldability of the thermoplastic resin composition and may be prepared by graft polymerization of a monomer mixture including an aromatic vinyl monomer and a vinyl cyanide monomer to a rubber polymer. For example, the rubber-modified vinyl graft copolymer may be obtained by graft polymerization of a monomer mixture including an aromatic vinyl monomer and a vinyl cyanide monomer to a rubber polymer other than acrylate rubber polymers. The monomer mixture may further include a monomer imparting processability and heat resistance, as needed. Here, the graft polymerization may be performed by any typical polymerization method known in the art, such as emulsion polymerization and suspension polymerization. In addition, the rubber-modified vinyl graft copolymer may have a core (rubber polymer)-shell (copolymer of the monomer mixture) structure, without being limited thereto.

Examples of the rubber polymer may include diene rubbers such as polybutadiene, poly(styrene-butadiene), and poly(acrylonitrile-butadiene); saturated rubbers obtained by adding hydrogen to the diene rubbers; isoprene rubbers; and ethylene-propylene-diene monomer terpolymers (EPDM), without being limited thereto. These may be used alone or as a mixture thereof. For example, the rubber polymer may be a butadiene rubber.

In one embodiment, the rubber polymer (rubber particles) may have an average (z-average) particle diameter of about 0.05 μm to about 6 μm, for example, about 0.15 μm to about 4 μm, and as another example about 0.25 μm to about 3.5 μm. Within this range, the thermoplastic resin composition can have good properties in terms of impact resistance and/or appearance.

In one embodiment, the rubber polymer may be present in an amount of about 20 wt % to about 70 wt %, for example, about 30 wt % to about 60 wt %, based on the total weight (100 wt %) of the rubber-modified vinyl graft copolymer, and the monomer mixture (including the aromatic vinyl monomer and the vinyl cyanide monomer) may be present in an amount of about 30 wt % to about 80 wt %, for example, about 40 wt % to about 70 wt %, based on the total weight (100 wt %) of the rubber-modified vinyl graft copolymer. Within this range, the thermoplastic resin composition can have good properties in terms of impact resistance and/or appearance.

In some embodiments, the rubber-modified vinyl graft copolymer may include the rubber polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments, the amount of the rubber polymer can be in a range from about any of the foregoing amounts to about any other of the foregoing amounts.

In some embodiments, the rubber-modified vinyl graft copolymer may include the monomer mixture in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the monomer mixture can be in a range from about any of the foregoing amounts to about any other of the foregoing amounts.

In one embodiment, the aromatic vinyl monomer is graft-copolymerizable with the rubber copolymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof.

The aromatic vinyl monomer may be present in an amount of about 10 wt % to about 90 wt %, for example, about 40 wt % to about 90 wt %, based on the total weight (100 wt %) of the monomer mixture. In some embodiments, the monomer mixture may include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl monomer can be in a range from about any of the foregoing amounts to about any other of the foregoing amounts. Within this range, the thermoplastic resin composition can have good properties in terms of processability and/or impact resistance.

In one embodiment, the vinyl cyanide monomer is copolymerizable with the aromatic vinyl monomer and may include, for example, acrylonitrile, methacrylonitrile, ethacrylonitrile, phenylacrylonitrile, α-chloroacrylonitrile, and fumaronitrile. These may be used alone or as a mixture thereof. For example, the vinyl cyanide monomer may be acrylonitrile and/or methacrylonitrile.

The vinyl cyanide monomer may be present in an amount of about 10 wt % to about 90 wt %, for example, about 10 wt % to about 60 wt %, based on the total weight (100 wt %) of the monomer mixture. In some embodiments, the monomer mixture may include the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the vinyl cyanide monomer can be in a range from about any of the foregoing amounts to about any other of the foregoing amounts. Within this range, the thermoplastic resin composition can have good chemical resistance and/or mechanical properties.

In one embodiment, the monomer imparting processability and heat resistance may include, for example, (meth) acrylic acid, maleic anhydride, and/or N-substituted maleimide, without being limited thereto. When the monomer mixture includes the monomer imparting processability and heat resistance, the monomer imparting processability and heat resistance may be present in an amount of about 15 wt % or less, for example, about 0.1 wt % to about 10 wt %, based on the total weight (100 wt %) of the monomer mixture. In some embodiments, the monomer mixture may include the monomer imparting processability and heat resistance in an amount of 0 (the monomer imparting processability and heat resistance is not present), about 0 (the monomer imparting processability and heat resistance is present), about 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments, the amount of the monomer imparting processability and heat resistance can be in a range from about any of the foregoing amounts to about any other of the foregoing amounts. Within this range, the monomer imparting processability and heat resistance can impart processability and heat resistance to the thermoplastic resin composition, with minimum or no deterioration in other properties.

In one embodiment, the rubber-modified vinyl graft copolymer may be, for example, an acrylonitrile-butadiene-styrene graft copolymer (g-ABS) in which a styrene monomer as the aromatic vinyl compound and an acrylonitrile monomer as the vinyl cyanide compound are grafted to a butadiene rubber polymer.

In one embodiment, the rubber-modified vinyl graft copolymer may be present in an amount of about 15 wt % to about 50 wt %, for example, about 20 wt % to about 45 wt %, based on the total weight (100 wt %) of the thermoplastic resin (100 wt % of the rubber-modified vinyl graft copolymer and the aromatic vinyl copolymer resin). In some embodiments, the thermoplastic resin may include the rubber-modified vinyl graft copolymer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the rubber-modified vinyl graft copolymer can be in a range from about any of the foregoing amounts to about any other of the foregoing amounts. Within this range, the thermoplastic resin composition can have good properties in terms of impact resistance, flowability (moldability), appearance, and balance therebetween.

(A2) Aromatic Vinyl Copolymer Resin

According to the present invention, the aromatic vinyl copolymer resin may be any typical aromatic vinyl copolymer resin used in preparation of rubber-modified vinyl copolymer resins. For example, the aromatic vinyl copolymer resin may be a copolymer of a monomer mixture including an aromatic vinyl monomer and a monomer copolymerizable with the aromatic vinyl monomer, such as a vinyl cyanide monomer.

In one embodiment, the aromatic vinyl copolymer resin may be prepared by mixing the aromatic vinyl monomer with the monomer copolymerizable with the aromatic vinyl monomer, followed by polymerization of the mixture. Here, the polymerization may be performed by any typical polymerization method known in the art, such as emulsion polymerization, suspension polymerization, and/or mass polymerization.

Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof.

The aromatic vinyl monomer may be present in an amount of about 20 wt % to about 90 wt %, for example, about 30 wt % to about 80 wt %, based on the total weight (100 wt %) of the aromatic vinyl copolymer resin. In some embodiments, the aromatic vinyl copolymer resin may include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl monomer can be in a range from about any of the foregoing amounts to about any other of the foregoing amounts. Within this range, the thermoplastic resin composition can have good properties in terms of impact resistance and/or flowability.

Examples of the monomer copolymerizable with the aromatic vinyl monomer may include without limitation vinyl cyanide monomers, such as acrylonitrile, methacrylonitrile, ethacrylonitrile, phenylacrylonitrile, α-chloroacrylonitrile, and fumaronitrile. These may be used alone or as a mixture thereof.

The monomer copolymerizable with the aromatic vinyl monomer may be present in an amount of about 10 wt % to about 80 wt %, for example, about 20 wt % to about 70 wt %, based on the total weight (100 wt %) of the aromatic vinyl copolymer resin. In some embodiments, the aromatic vinyl copolymer resin may include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the monomer copolymerizable with the aromatic vinyl monomer can be in a range from about any of the foregoing amounts to about any other of the foregoing amounts. Within this range, the thermoplastic resin composition can have good properties in terms of impact resistance and/or flowability.

In one embodiment, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good properties in terms of mechanical strength and/or moldability.

In one embodiment, the aromatic vinyl copolymer resin may be present in an amount of about 50 wt % to about 85 wt %, for example, about 55 wt % to about 80 wt %, based on the total weight (100 wt %) of the thermoplastic resin (100 wt % of the rubber-modified vinyl graft copolymer and the aromatic vinyl copolymer resin). In some embodiments, the thermoplastic resin may include the aromatic vinyl copolymer resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt %. Further, according to some embodiments, the amount of the aromatic vinyl copolymer resin can be in a range from about any of the foregoing amounts to about any other of the foregoing amounts. Within this range, the thermoplastic resin composition can have good properties in terms of impact resistance and/or flowability (moldability).

(B) Light Stabilizer

According to the present invention, the light stabilizer serves to improve weather resistance and/or antibacterial properties (activity) of the thermoplastic resin composition along with the zinc oxide and includes (B1) the hindered amine light stabilizer (HALS) and (B2) the benzotriazole UV stabilizer.

(B1) HALS

Examples of the HALS may include without limitation bis(2,2,6,6-tetramethyl-4-piperidyl) sebacate, bis-(n-octyloxy-tetramethyl)piperidinyl sebacate, bis(1,2,2,6,6-pentamethyl-4-piperidyl) sebacate, methyl-1,2,2,6,6-pentamethyl-4-piperidyl sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, 1,2,3-tris(1,2,2,6,6-pentamethyl-4-piperidyl)-4-tridecyl butane-1,2,3,4-tetracarboxylate, 1,2,3-tris(2,2,6,6-tetramethyl-4-piperidyl)-4-tridecyl butane-1,2,3,4-tetracarboxylate, 1,2,3,4-butanetetracarboxylic acid, a condensate of 1,2,2,6,6-pentamethyl-4-piperidinol and β,β,β',β'-tetramethyl-3,9-(2,4,8,10-tetraoxaspiro[5.5]undecane)diethanol, and combinations thereof. For example, the HALS may be bis(2,2,6,6-tetramethyl-4-piperidyl) sebacate.

In one embodiment, the HALS light stabilizer may be present in an amount of about 0.05 parts by weight to about 5 parts by weight, for example, about 0.1 parts by weight to about 3 parts by weight, and as another example about 0.2 parts by weight to about 1 part by weight, relative to about 100 parts by weight of the thermoplastic resin. In some embodiments, the thermoplastic resin composition may include the HALS in an amount of about 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments, the amount of the HALS can be in a range from about any of the foregoing amounts to about any other of the foregoing amounts. Within this range, the thermoplastic resin composition can have good properties in terms of weather resistance and/or antibacterial properties (activity).

(B2) Benzotriazole UV Stabilizer

Examples of the benzotriazole UV stabilizer may include without limitation 2-(2H-benzotriazole-2-yl)-4-(1,2,3,3-tetramethylbutyl)phenol, 2-(2'-hydroxy-5'-methylphenylbenzotriazole), 2-(2'-hydroxy-3,5'-2-(2'-hydroxy-3,5'-benzotriazole), 2-(2'-hydroxy-3'-tert-butyl-5'-methylphenyl)-5-chlorobenzotriazole), 2-(2'-hydroxy-3,5'-di-tert-butylphenyl)-5-chlorobenzotriazole, 2-(2'-hydroxy-3,5'-di-tert-amylphenyl)benzotriazole, 2-(2H-benzotriazole-2-yl)-4-(1,1,3,3-tetramethylbutyl)phenol, 2-[2'-hydroxy-3,5'-di(1,1-dimethylbenzyl)phenyl]-2H-benzotriazole, bis[2-hydroxy-5-tert-octyl-3-(benzotriazole-2-yl)phenyl] methane, and combinations thereof. For example, the benzotriazole UV stabilizer may be 2-(2H-benzotriazole-2-yl)-4-(1,2,3,3-tetramethylbutyl)phenol.

In one embodiment, the benzotriazole UV stabilizer may be present in an amount of about 0.05 parts by weight to about 5 parts by weight, for example, about 0.1 parts by weight to about 3 parts by weight, and as another example about 0.3 parts by weight to about 1 part by weight, relative to about 100 parts by weight of the thermoplastic resin. In some embodiments, the thermoplastic resin composition may include the benzotriazole UV stabilizer in an amount of about 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments, the amount of the benzotriazole UV stabilizer can be in a range from about any of the foregoing amounts to about any other of the foregoing amounts. Within this range, the thermoplastic resin composition can have good properties in terms of weather resistance and/or antibacterial (properties) activity.

In one embodiment, a weight ratio of the HALS (B1) to the benzotriazole UV stabilizer (B2) (B1:B2) may range from about 1:0.9 to about 1:2, for example, about 1:1 to about 1:1.5. In some embodiments, the weight ratio of the HALS (B1) to the benzotriazole UV stabilizer (B2) (B1:B2) may about 1:0.9, 1:1, 1:1.1, 1:1.2, 1:1.3, 1:1.4, 1:1.5, 1:1.6, 1:1.7, 1:1.8, 1:1.9, or 1:2. Within this range, the thermoplastic resin composition may have further improved weather resistance.

(C) Zinc Oxide

According to the present invention, the zinc oxide serves to improve weather resistance and/or antibacterial properties (activity) of the thermoplastic resin composition along with the light stabilizer and may have an average particle diameter of about 0.5 μm to about 3 μm, for example, about 1 μm to about 3 μm, as measured using a particle analyzer, a BET specific surface area of about 1 $m^2/g$ to about 10 $m^2/g$, for example, about 1 $m^2/g$ to about 7 $m^2/g$, and a purity of about 99% or higher. If these parameters of the zinc oxide are outside these ranges, the thermoplastic resin composition can have poor properties in terms of weather resistance and/or antibacterial properties (activity).

In some embodiments, the zinc oxide may have an average particle diameter (D50) of about 0.5, 0.6, 0.7, 0.8, 0.9, 1, 2, or 3 μm. Average particle diameter can be measured in a single particle state (not forming a secondary particle through agglomeration of particles) using a particle analyzer (Laser Diffraction Particle Size Analyzer LS 13 320, Beckman Coulter Co., Ltd.) as known in the art and as understood by the skilled artisan.

In some embodiments, the zinc oxide may have a BET specific surface area of about 1, 2, 3, 4, 5, 6, 7, 8, 9, or 10 $m^2/g$ as measured by a nitrogen gas adsorption method using a BET analyzer (Surface Area and Porosity Analyzer ASAP 2020, Micromeritics Co., Ltd.).

In one embodiment, the zinc oxide may have a peak intensity ratio (B/A) of about 0 to about 1, for example, about 0.01 to about 1, and as another example about 0.1 to about 1, wherein A indicates a peak in the wavelength range of 370 nm to 390 nm and B indicates a peak in the wavelength range of 450 nm to 600 nm in photoluminescence measurement. In some embodiments, the zinc oxide may have a peak intensity ratio (B/A) of about 0, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1. Within this range, the thermoplastic resin composition can have further improved weather resistance and/or antibacterial properties (activity).

In one embodiment, the zinc oxide may have a peak position degree (2θ) in the range of 35° to 37° and a crystallite size of about 1,000 Å to about 2,000 Å, for example, about 1,200 Å to about 1,800 Å in analysis of X-ray diffraction (XRD), as calculated by Scherrer's Equation (Equation 1) with reference to a measured FWHM value (full width at half maximum of a diffraction peak). Within this range, the thermoplastic resin composition can have good properties in terms of initial color, weather resistance and/or antibacterial properties (activity).

$$\text{Crystallite size } (D) = \frac{K\lambda}{\beta\cos\theta} \quad \text{[Equation 1]}$$

wherein K is a shape factor, λ is an X-ray wavelength, β is an FWHM value (degree) of an X-ray diffraction peak, and θ is a peak position degree.

In one embodiment, the zinc oxide may be prepared by melting metallic zinc in a reactor, heating the molten zinc to about 850° C. to about 1,000° C., for example, about 900° C. to about 950° C., to vaporize the molten zinc, cooling the vaporized zinc to a temperature of about 20° C. to about 30° C. while injecting oxygen gas into the reactor, heating the cooled zinc to about 700° C. to about 800° C. for about 30 minutes to about 150 minutes while injecting nitrogen/hydrogen gas into the reactor, as needed, and cooling the heated zinc to room temperature (about 20° C. to about 30° C.).

In one embodiment, the zinc oxide may be present in an amount of about 0.1 parts by weight to about 15 parts by weight, for example, about 0.5 parts by weight to about 10 parts by weight, and as another example about 1 part by weight to about 4 parts by weight, relative to about 100 parts by weight of the thermoplastic resin. In some embodiments, the thermoplastic resin composition may include the zinc oxide in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 parts by weight. Further, according to some embodiments, the amount of the zinc oxide can be in a range from about any of the foregoing amounts to about any other of the foregoing amounts. Within this range, the thermoplastic resin composition can have good properties in terms of weather resistance, antibacterial properties (activity), impact resistance, and/or appearance.

In one embodiment, a weight ratio of the light stabilizer (B) to the zinc oxide (C) (B:C) may range from about 1:0.3 to about 1:20, for example, about 1:1 to about 1:20. In some embodiments, the weight ratio of the light stabilizer (B) to the zinc oxide (C) (B:C) may about 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, or 1:20. Within this range, the thermoplastic resin composition can have further improved weather resistance and/or antibacterial properties (activity).

In one embodiment, the thermoplastic resin composition may further include any typical additive included in thermoplastic resin compositions. Examples of the additive may include a flame retardant, fillers, an antioxidant, an anti-dripping agent, a lubricant, a release agent, a nucleating agent, an antistatic agent, a pigment, a dye, and combinations thereof, without being limited thereto. When the thermoplastic resin composition includes the additive, the additive may be present in an amount of about 0.001 parts by weight to about 40 parts by weight, for example, about 0.1 parts by weight to about 10 parts by weight relative to about 100 parts by weight of the thermoplastic resin.

In one embodiment, the thermoplastic resin composition may be prepared in pellet form by mixing the aforementioned components, followed by melt extrusion using a typical twin-screw extruder at about 200° C. to about 280° C., for example, about 220° C. to about 250° C.

In one embodiment, the thermoplastic resin composition may have a color variation (ΔE) of about 7 or less, for example, 0.1 to about 6, as calculated according to Equation 2:

$$\text{Color variation}(\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before/after exposure evaluation; Δa* is a difference ($a_1^* - a_0^*$) between a* values before/after exposure evaluation; and Δb* is a difference ($b_1^* - b_0^*$) between b* values before/after exposure evaluation, in which $L_0^*$, $a_0^*$ and $b_0^*$ are initial color values, as measured on an injection molded specimen having a size of 50 mm×90 mm×3 mm using a colorimeter, and $L_1^*$, $a_1^*$ and $b_1^*$ are color values, as measured on the specimen using the colorimeter after exposure evaluation for 300 hours under conditions in accordance with ASTM D4459.

In one embodiment, the thermoplastic resin composition may have a notched Izod impact strength of about 15 kgf·cm/cm to about 40 kgf·cm/cm, for example, about 20 kgf·cm/cm to about 30 kgf·cm/cm, as measured on a ⅛" thick specimen in accordance with ASTM D256.

In one embodiment, the thermoplastic resin composition may have an out-gas emission of about 3,000 ppm or less, for example, about 2,000 ppm to about 2,700 ppm, as measured on 3 g of a specimen after the specimen is placed on a petri dish, followed by heating to 250° C. for 2 hours.

In one embodiment, the thermoplastic resin composition may have an antibacterial activity of about 2 to about 7 (against *Staphylococcus*) and about 2 to about 7.0 (against *Escherichia coli*), for example, about 3 to about 6.5 (against *Staphylococcus*) and about 3 to about 6.5 (against *Escherichia coli*), as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

In accordance with other embodiments, a molded article is formed of the thermoplastic resin composition as set forth above. The thermoplastic resin composition may be prepared in pellet form. The prepared pellets may be formed into a molded article (product) by various molding methods such as injection molding, extrusion, vacuum molding, and casting. Such molding methods are well known to those skilled in the art. The molded article can have good properties in terms of weather resistance, antibacterial properties (activity), impact resistance, appearance, flowability (moldability), and balance therebetween, and thus may be used as an interior/exterior material for electric/electronic products, an interior/exterior material for automobiles, and an exterior material for buildings, without limitation.

Next, the present invention will be described in more detail with reference to the following examples. It should be understood that these examples are provided for illustration only and are not to be in any way construed as limiting the present invention.

EXAMPLE

Details of components used in Examples and Comparative Examples are as follows:

(A) Thermoplastic Resin
(A1) Rubber-Modified Vinyl Graft Copolymer
A g-ABS resin prepared by grafting 55 wt % of styrene and acrylonitrile (weight ratio: 75/25) to 45 wt % of butadiene rubber particles having a Z-average particle diameter of 310 nm
(A2) Aromatic vinyl copolymer resin
A SAN resin (weight average molecular weight: 130,000 g/mol) prepared by polymerization of 71 wt % styrene with 29 wt % acrylonitrile
(B) Light Stabilizer
(B1) HALS: bis(2,2,6,6-tetramethyl-4-piperidyl) sebacate
(B2) Benzotriazole UV stabilizer: 2-(2H-benzotriazol-2-yl)-4-(1,2,3,3-tetramethyl butyl)phenol
(B3) Hexadecyl-3,5-di-tert-butyl-4-hydroxybenzoate
(C) Zinc Oxide
(C1) Zinc oxide having an average particle diameter, a BET surface area, a purity, a peak intensity ratio (B/A) of peak A in the wavelength range of 370 nm to 390 nm to peak B in the wavelength range of 450 nm to 600 nm in photoluminescence measurement, and a crystallite size as listed in Table 1
(C2) Zinc oxide having an average particle diameter, a BET surface area, a purity, a peak intensity ratio (B/A) of peak A in the wavelength range of 370 nm to 390 nm to peak B in the wavelength range of 450 nm to 600 nm in photoluminescence measurement, and a crystallite size as listed in Table 1

TABLE 1

|  | (C1) | (C2) |
| --- | --- | --- |
| Average particle diameter (μm) | 1.2 | 1.1 |
| BET surface area (m²/g) | 4 | 15 |
| Purity (%) | 99 | 97 |
| PL peak intensity ratio (B/A) | 0.28 | 9.8 |
| Crystallite size (Å) | 1,417 | 503 |

Property Evaluation of Zinc Oxide
(1) Average particle diameter (unit: μm): Average particle diameter (D50) is measured using a particle analyzer (Laser Diffraction Particle Size Analyzer LS 13 320, Beckman Coulter Co., Ltd.).
(2) BET surface area (unit: m2/g): BET surface area is measured by a nitrogen gas adsorption method using a BET analyzer (Surface Area and Porosity Analyzer ASAP 2020, Micromeritics Co., Ltd.).

(3) Purity (unit: %): Purity is measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm at room temperature is detected by a CCD detector in a photoluminescence measurement method, in which the CCD detector is maintained at −70° C. A peak intensity ratio (B/A) of peak A in the wavelength range of 370 nm to 390 nm to peak B in the wavelength range of 450 nm to 600 nm is measured. Here, an injection molded specimen is irradiated with laser beams without separate treatment upon PL analysis, and zinc oxide powder is compressed in a pelletizer having a diameter of 6 mm to prepare a flat specimen.

(5) Crystallite size (unit: Å): Crystallite size is measured using a high-resolution X-ray diffractometer (PRO-MRD, X'pert Inc.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used in this test. For more accurate analysis, the injection molded specimen is subjected to heat treatment at 600° C. in air for 2 hours to remove a polymer resin therefrom before XRD analysis.

$$\text{Crystallite size } (D) = \frac{K\lambda}{\beta \cos\theta} \qquad \text{[Equation 1]}$$

where K is a shape factor, λ is an X-ray wavelength, β is an FWHM value (degree) of an X-ray diffraction peak, and θ is a peak position degree.

Examples 1 to 5 and Comparative Examples 1 to 7

The aforementioned components are mixed in amounts as listed in Tables 2 to 3, followed by melt extrusion at 230° C., thereby preparing a thermoplastic resin composition in pellet form. Here, extrusion is performed using a twin-screw extruder (L/D=36, φ45 mm). The prepared pellets are dried at 80° C. for 2 hours or more, followed by injection molding using a 6 oz. injection molding machine (molding temperature: 230° C., mold temperature: 60° C.), thereby preparing a specimen. The prepared specimen is evaluated as to the following properties and results are shown in Tables 2 to 3.

Property Evaluation
(1) Weather resistance (color variation (ΔE)): For calculation of color difference, initial color values $L_0^*$, $a_0^*$ and $b_0^*$ are measured on an injection molded specimen having a size of 50 mm×90 mm×3 mm using a colorimeter (model: CM-2600d, KONICA MINOLTA Co., Ltd.), and color values $L_1^*$, $a_1^*$ and $b_1^*$ are measured on the specimen using the colorimeter after exposure evaluation for 300 hours under conditions in accordance with ASTM D4459. Color variation (ΔE) is calculated by Equation 2.

$$\text{Color variation}(\Delta E) = \sqrt{(\Delta L^*)^2 + (\Delta a^*)^2 + (\Delta b^*)^2} \qquad \text{[Equation 2]}$$

wherein ΔL* is a difference ($L_1^* - L_0^*$) between L* values before/after exposure evaluation; Δa* is a difference ($a_1^* - a_0^*$) between a* values before/after exposure evaluation; and Δb* is a difference ($b_1^* - b_0^*$) between b* values before/after exposure evaluation.

(2) Notched Izod impact strength (unit: kgf·cm/cm): Notched Izod impact strength is measured on a ⅛" thick specimen in accordance with ASTM D256.

(3) Out-gas emission (unit: ppm): Out-gas emission is measured on 3 g of a thermoplastic resin composition specimen (pellet) after the specimen was placed in a petri dish (diameter: 90 mm), followed by heating to 250° C. for 2 hours.

(4) Antibacterial activity: Antibacterial activity is measured on a 5 cm×5 cm specimen obtained by inoculation with each of *Staphylococcus aureus* and *Escherichia coli*, followed by culturing under conditions of 35° C. and 90% RH for 24 hours in accordance with JIS Z 2801.

TABLE 2

|  |  | Example | | | | |
|---|---|---|---|---|---|---|
|  |  | 1 | 2 | 3 | 4 | 5 |
| (A) | (A1) | 30 | 30 | 30 | 30 | 30 |
| (wt %) | (A2) | 70 | 70 | 70 | 70 | 70 |
| (B) | (B1) | 0.2 | 3 | 0.1 | 0.2 | 0.2 |
| (parts by weight) | (B2) | 0.3 | 3 | 0.1 | 0.3 | 0.3 |
|  | (B3) | — | — | — | — | — |
| (C) | (C1) | 2 | 2 | 2 | 0.5 | 10 |
| (parts by weight) | (C2) | — | — | — | — | — |
| Color variation (ΔE) |  | 5.0 | 4.0 | 6.0 | 5.0 | 4.0 |
| Notched Izod impact strength |  | 25 | 25 | 25 | 25 | 20 |
| Out-gas emission |  | 2,500 | 3,000 | 2,300 | 2,500 | 2,500 |
| Antibacterial activity (*Escherichia coli*) |  | 4.0 | 4.0 | 4.0 | 3.0 | 4.0 |
| Antibacterial activity (*Staphylococcus aureus*) |  | 6.5 | 6.5 | 6.5 | 5.0 | 6.5 |

\* Parts by weight relative to 100 parts by weight of the thermoplastic resin (A)

TABLE 3

|  |  | Comparative Example | | | | | | |
|---|---|---|---|---|---|---|---|---|
|  |  | 1 | 2 | 3 | 4 | 5 | 6 | 7 |
| (A) | (A1) | 30 | 30 | 30 | 30 | 30 | 30 | 30 |
| (wt %) | (A-2) | 70 | 70 | 70 | 70 | 70 | 70 | 70 |
| (B) | (B1) | — | 0.5 | 0.2 | 0.2 | — | 0.2 | — |
| (parts by weight) | (B2) | 0.5 | — | 0.3 | — | 0.3 | — | 0.5 |
|  | (B3) | — | — | — | 0.3 | 0.2 | — | — |
| (C) | (C1) | 2 | 2 | — | 2 | 2 | — | — |
| (parts by weight) | (C2) | — | — | 2 | — | — | — | — |
| Color variation (ΔE) |  | 6.0 | 6.0 | 11.0 | 9.0 | 9.2 | 12.0 | 9.0 |
| Notched Izod impact strength |  | 20 | 20 | 20 | 20 | 20 | 20 | 20 |
| Out-gas emission |  | 4,000 | 5,000 | 9,000 | 8,000 | 8,000 | 10,000 | 9,000 |
| Antibacterial activity (*Escherichia coli*) |  | 4.0 | 4.0 | 2.5 | 4.0 | 4.0 | 0 | 0 |
| Antibacterial activity (*Staphylococcus aureus*) |  | 6.5 | 6.5 | 4.0 | 6.5 | 6.5 | 0 | 0 |

\* Parts by weight relative to 100 parts by weight of the thermoplastic resin (A)

From the results shown in Tables 2 and 3, it can be seen that the thermoplastic resin composition according to the present invention have good properties in terms of weather resistance, impact resistance, and antibacterial properties (activity) and exhibit low out-gas emission, thereby reducing appearance defects.

Conversely, the thermoplastic resin composition of Comparative Example 1 without the HALS (B1) and the thermoplastic resin composition of Comparative Example 2 without the benzotriazole UV stabilizer (B2) exhibit high out-gas emission, and the thermoplastic resin composition of Comparative Example 3 using the zinc oxide (C2) instead of the zinc oxide (C1) according to the present invention and the thermoplastic resin compositions of Comparative Examples 6 and 7 exhibit high out-gas emission, have poor weather resistance, and have relatively poor or insignificant antibacterial properties (activity). In addition, the thermoplastic resin compositions of Comparative Examples 4 and 5 using the benzoate light stabilizer (B3) instead of the HALS (B1) and the benzotriazole UV stabilizer (B2), respectively, have poor weather resistance and exhibit high out-gas emission.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   a thermoplastic resin comprising a rubber-modified vinyl graft copolymer and an aromatic vinyl copolymer resin;
   a light stabilizer comprising a hindered amine light stabilizer (HALS) and a benzotriazole UV stabilizer; and
   zinc oxide, the zinc oxide having an average particle diameter of about 0.5 μm to about 3 μm and a BET specific surface area of about 1 m²/g to about 10 m²/g, a peak position degree (2θ) in the range of 35° to 37° and a crystallite size of about 1,000 Å to about 2,000 Å in analysis of X-ray diffraction (XRD), as calculated by Equation 1:

$$\text{Crystallite size } (D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree, wherein the thermoplastic resin composition has an out-gas emission of about 3,000 ppm or less, as measured on 3 g of a specimen after the specimen is placed on a petri dish, followed by heating to 250° C. for 2 hours.

2. The thermoplastic resin composition according to claim 1, comprising: about 100 parts by weight of the thermoplastic resin comprising about 15 wt % to about 50 wt % of the rubber-modified vinyl graft copolymer and about 50 wt % to about 85 wt % of the aromatic vinyl copolymer resin; about 0.05 parts by weight to about 5 parts by weight of the HALS; about 0.05 parts by weight to about 5 parts by weight of the benzotriazole UV stabilizer; and about 0.1 parts by weight to about 15 parts by weight of the zinc oxide.

3. The thermoplastic resin composition according to claim 1, wherein the rubber-modified vinyl graft copolymer is obtained by graft polymerization of a monomer mixture comprising an aromatic vinyl monomer and a vinyl cyanide monomer to a rubber polymer other than acrylate rubber polymers.

4. The thermoplastic resin composition according to claim 1, wherein the aromatic vinyl copolymer resin is a polymer of an aromatic vinyl monomer and a monomer copolymerizable with the aromatic vinyl monomer.

5. The thermoplastic resin composition according to claim 1, wherein the HALS comprises bis(2,2,6,6-tetramethyl-4-piperidyl) sebacate, bis-(n-octyloxy-tetramethyl)piperidinyl sebacate, bis(1,2,2,6,6-pentamethyl-4-piperidyl) sebacate, methyl-1,2,2,6,6-pentamethyl-4-piperidyl sebacate, tetrakis (2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, 1,2,3-tris(1,2,2,6,6-pentamethyl-4-piperidyl)-4-tridecyl butane-1,2,3,4-tetracarboxylate, 1,2,3-tris(2,2,6,6-tetramethyl-4-piperidyl)-4-tridecyl butane-1,2,3,4-tetracarboxylate, and a condensate of 1,2,2,6,6-pentamethyl-4-piperidinol and/or β,β,β',β'-tetramethyl-3,9-(2,4,8,10-tetraoxaspiro[5.5]undecane)diethanol.

6. The thermoplastic resin composition according to claim 1, wherein the benzotriazole UV stabilizer comprises 2 (2H-benzotriazole-2-yl)-4-(1,2,3,3-tetramethylbutyl)phenol, 2-(2'-hydroxy-5'-methylphenylbenzotriazole), 2-(2'-hydroxy-3',5'-2-(2'-hydroxy-3,5'-benzotriazole), 2-(2'-hydroxy-3'-tert-butyl-5'-methylphenyl)-5-chlorobenzotriazole), 2-(2'-hydroxy-3,5'-di-tert-butylphenyl)-5-chlorobenzotriazole, 2-(2'-hydroxy-3,5'-di-tert-amylphenyl)benzotriazole, 2-(2H-benzotriazol e-2-yl)-4-(1,1,3,3-tetramethylbutyl)phenol, 2-[2'-hydroxy-3,5'-di(1,1-dimethylbenzyl)phenyl]-2H-benzotriazole, and/or bis[2-hydroxy-5-tert-octyl-3-(benzotriazol e-2-yl)phenyl] methane.

7. The thermoplastic resin composition according to claim 1, wherein the zinc oxide has a peak intensity ratio (B/A) of about 0 to about 1, where A indicates a peak in the wavelength range of 370 nm to 390 nm and B indicates a peak in the wavelength range of 450 nm to 600 nm in photoluminescence measurement.

8. The thermoplastic resin composition according to claim 1, wherein a weight ratio of the HALS to the benzotriazole UV stabilizer (HALS:benzotriazole UV stabilizer) ranges from about 1:0.9 to about 1:2.

9. The thermoplastic resin composition according to claim 1, wherein a weight ratio of the light stabilizer to the zinc oxide (light stabilizer:zinc oxide) ranges from about 1:0.3 to about 1:20.

10. The thermoplastic resin composition according to claim 1, wherein the thermoplastic resin composition has a color variation (ΔE) of about 7 or less, as calculated according to Equation 2:

$$\text{Color variation}(\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before/after exposure evaluation; Δa* is a difference ($a_1^* - a_0^*$) between a* values before/after exposure evaluation; and Δb* is a difference ($b_1^* - b_0^*$) between b* values before/after exposure evaluation, in which $L_0^*$, $a_0^*$ and $b_0^*$ are initial color values, as measured on an injection molded specimen having a size of 50 mm×90 mm×3 mm using a colorimeter, and $L_1^*$, $a_1^*$ and $b_1^*$ are color values, as measured on the specimen using the colorimeter after exposure evaluation for 300 hours under conditions in accordance with ASTM D4459.

11. The thermoplastic resin composition according to claim 1, wherein the thermoplastic resin composition has a notched Izod impact strength of about 15 kgf·cm/cm to about 40 kgf·cm/cm, as measured on a ⅛" thick specimen in accordance with ASTM D256.

12. The thermoplastic resin composition according to claim 1, wherein the thermoplastic resin composition has an antibacterial activity of about 2 to about 7 against *Staphylococcus* and about 2 to about 7 against *Escherichia coli*, as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

13. A molded article manufactured using the thermoplastic resin composition according to claim 1.

* * * * *